United States Patent
Bieg et al.

(10) Patent No.: US 6,234,703 B1
(45) Date of Patent: May 22, 2001

(54) DOUBLE SLOTTED SOCKET SPHERICAL JOINT

(75) Inventors: Lothar F. Bieg; Gilbert L. Benavides, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/336,308

(22) Filed: Jun. 18, 1999

(51) Int. Cl.[7] ..................... F16C 11/06
(52) U.S. Cl. ................ 403/115; 403/125; 403/143
(58) Field of Search ................. 403/116, 115, 403/114, 117, 113, 150, 122, 141, 142, 143, 125

(56) References Cited

U.S. PATENT DOCUMENTS

| | | | |
|---|---|---|---|
| 320,436 | * 6/1885 | Hock | 403/143 X |
| 325,352 | * 9/1885 | McKay | 403/115 X |
| 1,086,375 | * 2/1914 | LaFrance | 403/116 X |
| 2,126,443 | * 8/1938 | Begley | 403/114 X |
| 2,681,783 | * 6/1954 | Smith | 403/125 |
| 3,072,426 | * 1/1963 | Gilbert | 403/115 |
| 3,210,103 | * 10/1965 | Montgomery et al. | 403/115 |
| 3,250,555 | * 5/1966 | Wehner | 403/125 |
| 3,414,302 | * 12/1968 | Priest | 403/125 |
| 3,638,243 | * 2/1972 | Campbell, Jr. et al. | 403/115 X |
| 3,667,789 | * 6/1972 | McNeely et al. | 403/125 |
| 4,347,014 | * 8/1982 | Smith | 403/125 X |
| 5,899,167 | * 5/1999 | Furman | 403/143 X |
| 6,024,261 | * 2/2000 | Tseng | 403/122 X |

FOREIGN PATENT DOCUMENTS

1001078 * 10/1951 (FR) ................... 403/125

* cited by examiner

Primary Examiner—Lynne H. Browne
Assistant Examiner—David E. Bochna
(74) Attorney, Agent, or Firm—Brian W. Dodson

(57) ABSTRACT

A new class of spherical joints is disclosed. These spherical joints are capable of extremely large angular displacements (full cone angles in excess of 270°), while exhibiting no singularities or dead spots in their range of motion. These joints can improve or simplify a wide range of mechanical devices.

16 Claims, 6 Drawing Sheets

DOUBLE SLOTTED SOCKET SPHERICAL JOINT

This invention was made with Government support under Contract DE-AC04-94DP85000 awarded by the U.S. Department of Energy. The Government has certain rights in the invention.

BACKGROUND

The present invention relates generally to joint mechanisms, and more specifically to a new class of large displacement spherical joints. The spherical joint has long been a standard of mechanical design. The general nature of prior art spherical joints is shown in FIG. 1. Here a spherical body 10 makes bearing contact with a bearing cup 12 on a bearing surface 11. The term 'bearing contact' is intended to describe a juxtaposition between two mechanical components which allows them to easily move relative to each other restricted only by the structure of the bearing. The juxtaposition can be surfaces sliding on each other, with or without lubrication, or can be mediated by any of a wide range of conventional bearing elements, such as balls, rollers, and the like. The term 'bearing surface' shall be intended to include the mechanisms which comprise such mediated bearing contacts.

Such bearings generally perform best if bearing surface 11 is spherical in shape, and has a radius substantially equal to that of the spherical body 10, but neither condition is strictly necessary. For example, bearing cup 12 can take the form of a hollow tube, with the bearing surface taking the form of a ring on which the spherical body and the bearing cup make bearing contact. In another example, bearing cup 12 can be replaced by three properly spaced and oriented flat bearing pads, and the resulting bearing surface will have equivalent functionality. Of course, such a bearing surface would be expected to wear at a much faster rate than the illustrated structure.

A first shaft 13 is affixed to spherical body 10, generally but not necessarily aligned along a radius of the spherical body 10. A second shaft 14 can be affixed to bearing cup 12, although other mounting techniques, such as attaching bearing cup 12 to a joint base, can be used. Finally, spherical retainer 15 provides a second bearing surface 16 for spherical body 10. The two bearing surfaces are positioned so that spherical body 10 cannot move, other than through rotation in place, relative to the bearing cup and the spherical retainer.

The structure described above allows considerable freedom of motion of the two shafts relative to each other. Using the orientation of the second shaft as a reference, the first shaft can move freely within a full cone angle a while at the same time rotating freely about its own axis.

The primary restriction on the amount of movement allowed by a spherical joint is the interference between the first shaft and the spherical retainer when an attempt is made to move the first shaft to a position outside the allowed full cone of motion. This interference results from the need to provide a mechanical retainer to keep the spherical body in contact with the bearing cup so that the rotary motion thereof is well-defined.

In most commercially available mechanically restrained spherical joints the available full cone angle $\alpha$ is less than 40 degrees, and examples are simply not available with $\alpha > 60$ degrees. As prior art spherical joints were primarily used to accommodate minor shaft misalignments, the limited full cone angle was not a serious limitation.

There is a variety of prior art spherical joint that allows access to larger full cone angles. In these joints, the spherical retainer does not appear, and the spherical body is held within the bearing cup by magnetic attraction. Such joints, however, cannot tolerate large tensile forces, and are susceptible to dislocation under small dynamic or static forces which do not directly press the spherical body into the bearing cup. Such magnetic spherical joints thus have very limited fields of usage.

New applications for spherical joints have recently arisen for which a large allowed full cone angle is a great advantage. These include many of the parallel mechanisms on which flexible machining platforms and robotic manipulators are now based. In such applications, the greater allowed full cone angle contributes to increasing the workspace of the machine. The result is dramatic increase in efficiency, in large part driven by reducing the total setup time as a workpiece is dismounted and reoriented.

There is a prior art spherical joint that has the potential for providing somewhat larger allowed deflection angles, perhaps to full cone angles as large as 120–140 degrees, although to Applicants knowledge such have not been commercially available. This is the joint described in U.S. Pat. No. 4,628,765, Dien and Luce, issued Dec. 16, 1986 (now expired). In this patent is disclosed a spherical joint comprising a spherical body 20 mounted within a ring-shaped bearing 21 which allows rotation in any direction (see FIG. 2). A pair of semi-circular yokes 22 and 23 oriented along perpendicular axes provide a means to characterize and control the position of a shaft 24 attached to the spherical body. The ring-shaped bearing 21 mechanically retains the spherical body 20 by enclosing a diameter of the spherical body. This, however, has the effect of limiting the allowed deflection angle to values substantially less than 90 degrees. Such a ring-shaped bearing is also difficult and expensive to incorporate into a commercial joint.

There are numerous ways in which a concatenation of revolute joints can be assembled to mimic the behavior of a spherical joint. An example is shown in FIG. 3, where a 'spherical' joint between a first shaft 30 and a second shaft 31 is implemented by combining the effect of a revolute joint 32 imbedded in the end of second shaft 31 with the effect of a revolute fork joint 33 mounted upon revolute joint 32 so that the axis of revolution of the two joints are perpendicular. First shaft 30 is mounted on revolute fork joint 33 via revolute joint 34 so that first shaft 30 is free to turn about its own axis. In this design, three pairs of axles and matching bearings, together with a collection of precision machined and assembled components, are required to mimic the behavior of a spherical joint. In addition, the joint stability which follows naturally from having a spherical body firmly set on an appropriate bearing surface can only be achieved here by insisting on extremely tight manufacturing tolerances. Maintenance, useful life, and other practical considerations fall solidly on the side of the true spherical joint. In the end, even though the joint illustrated in FIG. 3 mimics the behavior of a spherical joint capable of very large deflection angles, in most cases it is not a practical option.

There is a need for a precision spherical joint which is mechanically stable and capable of large (i.e., $\alpha > 60$ degrees) full cone angles while remaining resistant to mechanical joint dislocation. Applicants have addressed this need by developing a new type of spherical joint which satisfies these criteria and more.

SUMMARY

The present invention is of a new type of spherical joint, capable of very large deflection angles. The new joint is similar to conventional spherical joints in that a shaft is (usually) radially fixed to a spherical body, and that spherical body is so confined by bearing surfaces (usually, but not necessarily comprising a concave spherical bearing surface having a spherical radius nearly that of the spherical body) which together define a unique spherical locus which matches the size of the spherical body and within which the spherical body is confined. The new feature is a special type of spherical retainer, containing some of the bearing surfaces, which guides the relative motions of the shaft and the sphere so that the mechanical interferences which limit the accessible deflection angle of conventional spherical joints are relieved.

DETAILED DESCRIPTION

Figure 1:
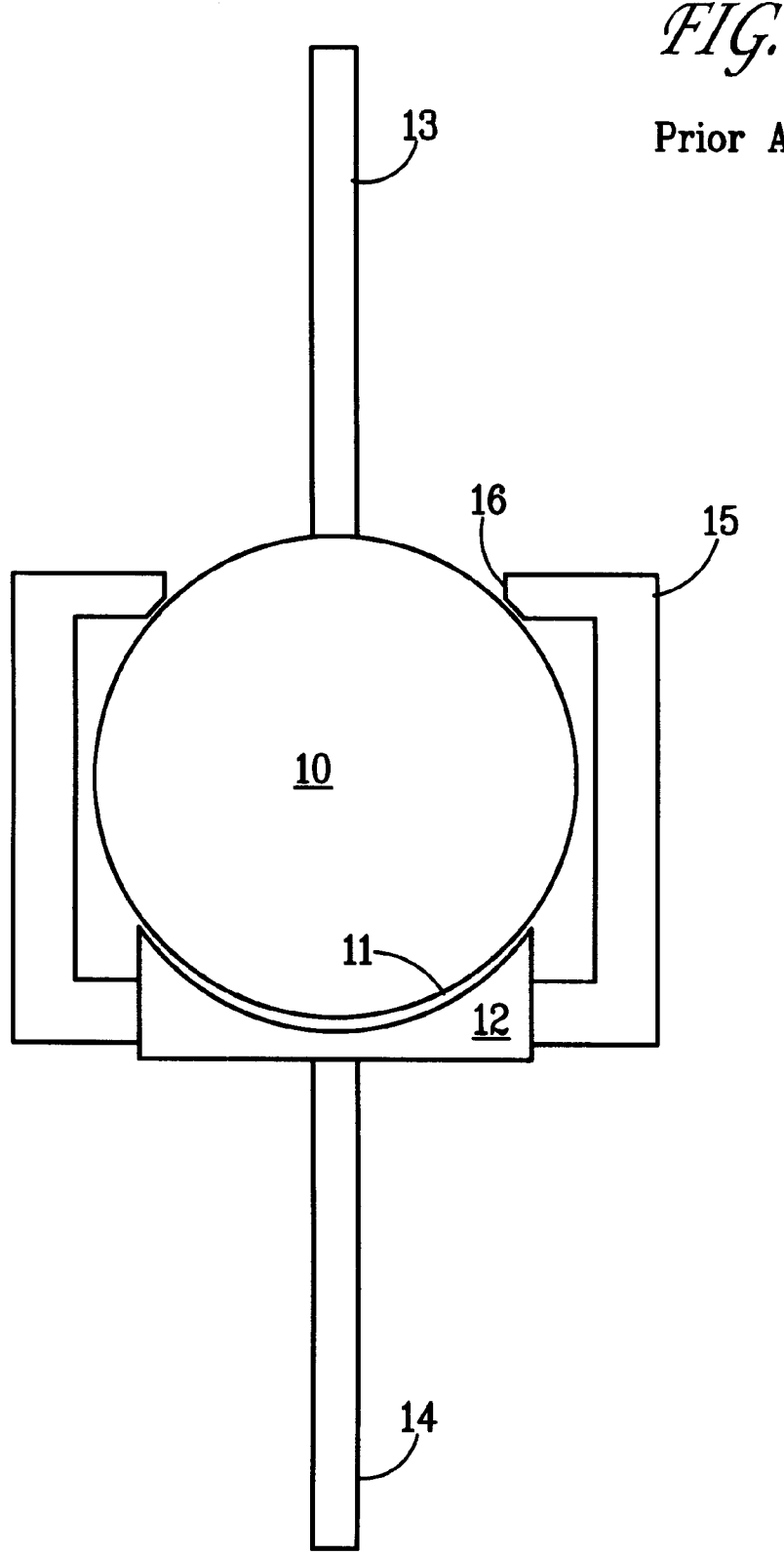
FIG. 1 shows a schematic diagram of a prior art spherical joint.
Figure 2:
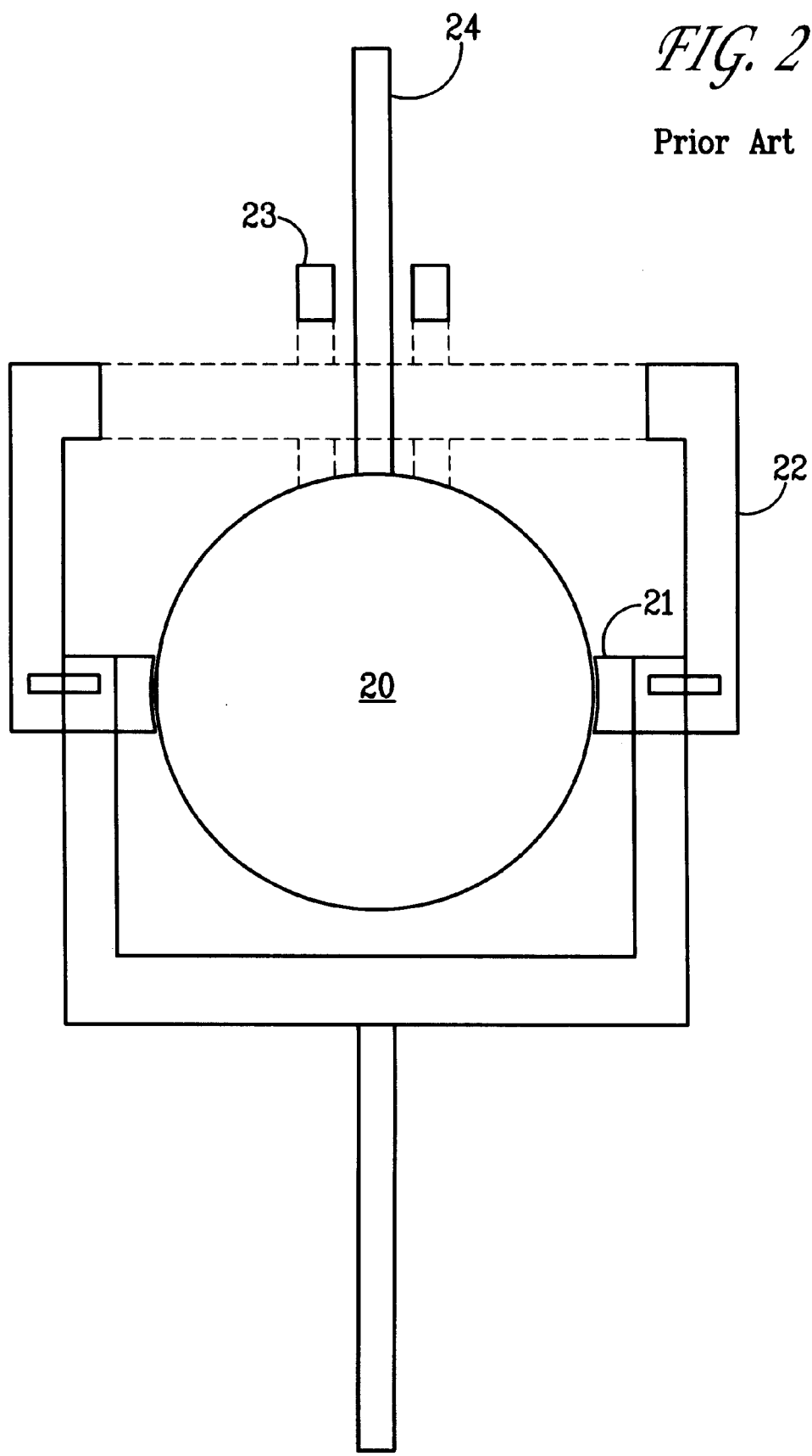
FIG. 2 shows a schematic diagram of a second variety of prior art spherical joint.
Figure 3:
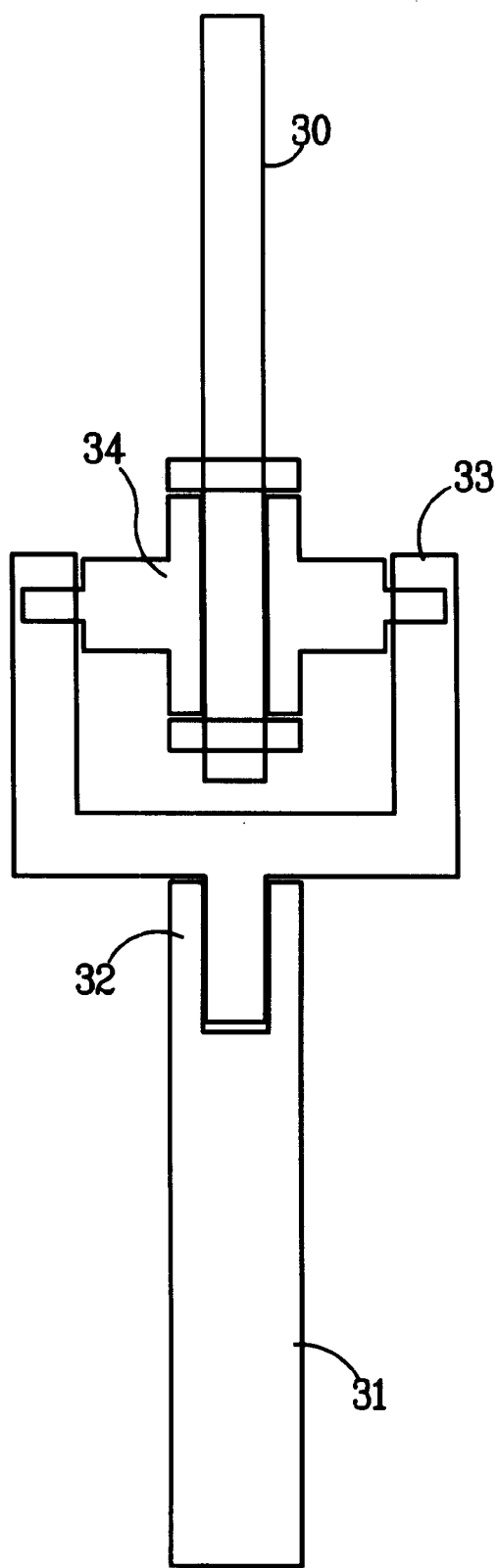
FIG. 3 shows schematically a mechanism which mimics the behavior of a spherical joint using only revolute joints.
Figure 4:
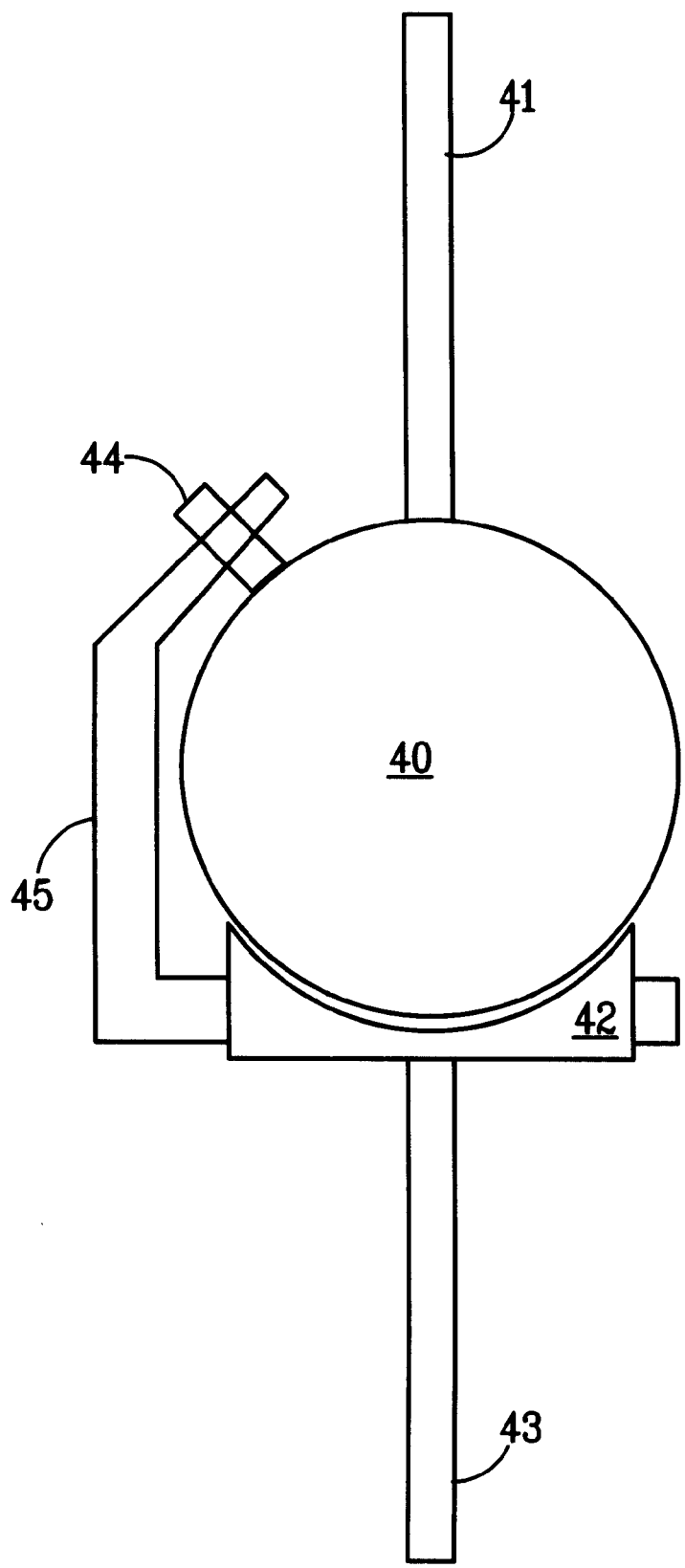
FIG. 4 shows schematically what a large displacement spherical joint might look like using prior art concepts.

Begin by illustrating the prior art problem to be overcome. FIG. 4 shows a spherical joint, not according to the present invention, which allows access to large deflection angles, although not large full cone angles. Spherical body 40 has a first shaft 41 radially affixed. Spherical body 40 rides on a bearing cup 42, to which is radially affixed a second shaft 43. (A joint base can be used in place of the second shaft.) Here, 'radially affixed' means that the shaft axis substantially intersects the center of the spherical body when the spherical body is placed on the bearing cup 42. The bearing surface on which the spherical body rides on the bearing cup can take the form of a concave sphere, typically having a radius nearly equal to that of the spherical body. However, a conical bearing surface, or indeed any shape which, while the spherical body rests against the bearing cup, restricts the motion of the spherical body to simple rotations about its center can be used.

A second bearing 44 is positioned so that the spherical body 40 rides on both the bearing cup and the second bearing, and so that the center of the spherical body is thereby constrained to reside at a single point. Note that this requires that the second bearing be located above the diameter of the spherical body 40 which is perpendicular to the axis of the second shaft 43. In this example, a C-shaped bearing support structure 45 fixes the relative position of the bearing cup and the second bearing, thereby trapping the spherical body between them, and attaches to the second shaft (or the bearing cup, which attachment is functionally equivalent).

The resulting joint can reach extremely large deflection angles in most directions, the primary restriction being interference between the first shaft and the bearing cup. Unfortunately, this desirable behavior is not seen in all orientations. The first shaft can also interfere with the second bearing and the bearing support structure, thereby preventing function as a spherical joint free to move within a large full cone angle. A moment's contemplation will show that such interferences occur in any joint in which the spherical body is retained by the relative positioning of two or more bearings.

A large displacement spherical joint can be designed by adding additional structure which either avoids the mechanical interferences of the basic spherical joint, or constrains the relative motion of the joint components so the mechanical interferences which still exist are automatically avoided.

Figure 5:
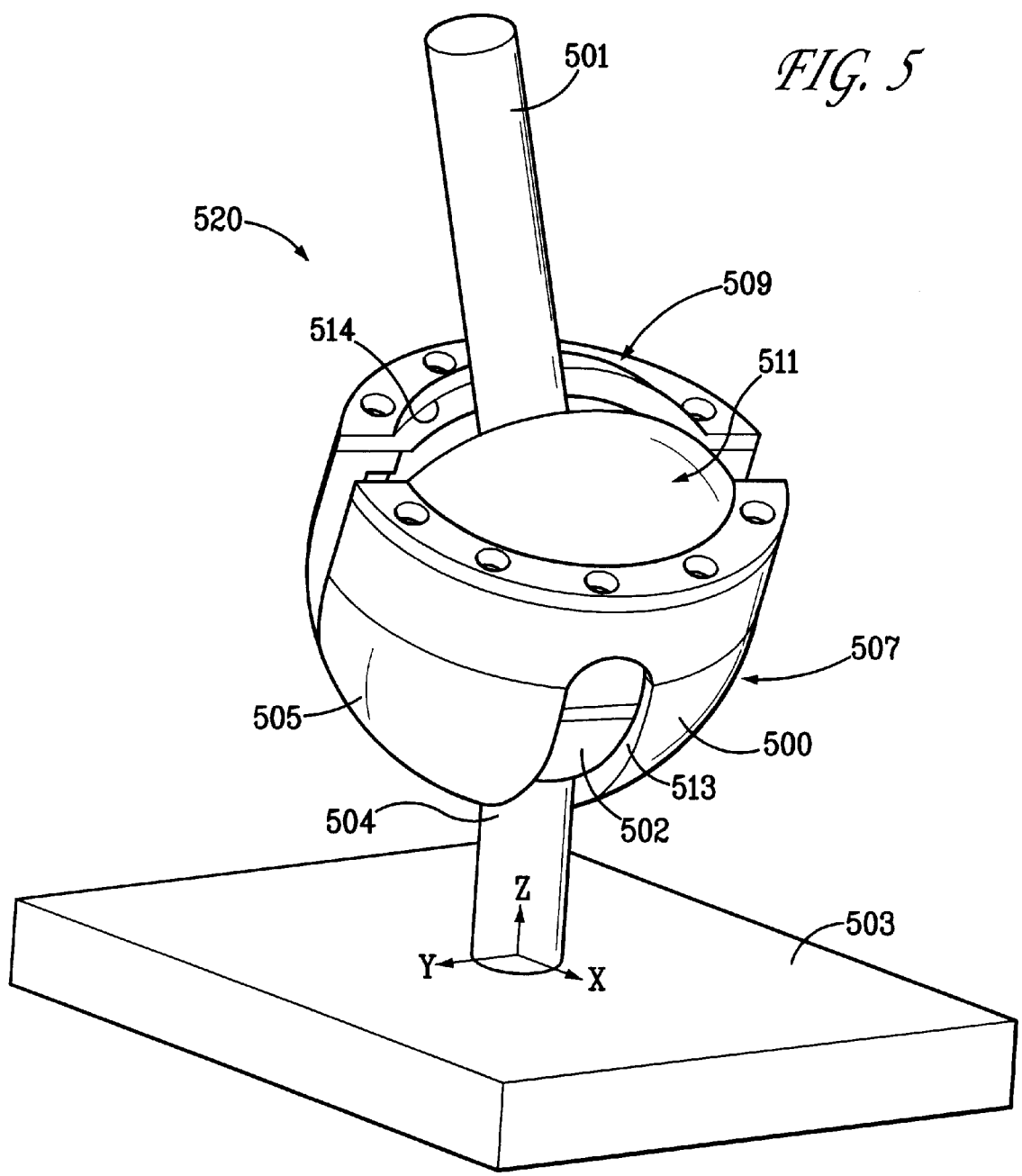
FIG. 5 shows schematically a double slotted socket spherical joint after the present invention.

An implementation of the present invention, called double slotted socket spherical joints, is shown in FIG. 5. A spherical body 500 with radially affixed first shaft 501 forms a first bearing surface with bearing cup 502. Bearing cup 502 is affixed to base shaft 504, which in turn is optionally affixed to joint base 503. As shown the base shaft is aligned with the normal to the joint base surface, but this is not required for joint operation.

The second bearing surface which serves to retain the spherical body in place is provided by the combined action of the split cup sockets 505 and 507, and the split retainers 509 and 511. The manner in which the second bearing surface is thereby defined is somewhat complex, but the resulting joint has a very large allowable full cone angle. It is possible to make a similar joint with somewhat smaller full cone angle potential by replacing the split cup sockets and/or the split retainers by single pieces which define similar joint motions. Numerous manners in which this can be accomplished will be clear to one skilled in the art.

Examining the joint structure upward from the previously described components, split cup sockets 505 and 507 are each attached to each of the split retainers 509 and 511. These mutual attachments produce a cage-like structure 520 surrounding the spherical body 500. Cage-like structure 520 defines a first elongate aperture 513, which is penetrated by base shaft 504, and a second elongate aperture 514, positioned at the opposite end of the cage-like structure and oriented (nominally) perpendicular to the first elongate aperture 513.

These elongate apertures serve to guide the relative motions of the first shaft and the base shaft. As shown, the first elongate aperture 513 is defined by a space between the split cup sockets 505 and 507, and the second elongate aperture 514 is defined by a space between the split retainers 509 and 511. The first elongate aperture also extends into split retainers 509 and 511, and the second elongate aperture extends into split cup sockets 505 and 507. These extensions produce a joint with very large accessible full cone angles.

Split cup socket 505 (and its mirror pair, 507) comprises an interior surface, and means to attach the cup socket to the split spherical retainers 509 and 511. These means are here shown as a bolted flange, but may comprise a threaded connection, adhesives, welding, brazing or soldering, clamps, or any of a wide range of similar and well-known attachments.

When the joint is properly assembled, the interior surfaces of the split cup sockets 505 and 507 make a third bearing surface with the bottom surface of the bearing cup 502. In the present implementation, this bearing surface is essentially spherical in shape, and centered at the center of the spherical body 500. As a result, the cage-like structure 520 is free to rotate around base shaft 504, as well as to slide relative to base shaft 504 in a cylindrical manner as constrained by the first elongate aperture 513.

The precise structure shown in the figure is not required to obtain the function required for the desired operation of the joint. For example, the interior surface of the split cup sockets could take the form of a network of spherical ribs, and the bottom surface of the bearing cup could be the end of a hollow tube (not shown). The third bearing surface would then be a circular locus of small contact points about the periphery of the hollow tube, but the essential feature of constraining the relative motion of the bearing cup and the cup socket is still satisfied.

Similarly, a different degree of constraint on the relative motion between the bearing cup 502 and the split cup sockets 505–507 is also consistent with the desired operation of a joint after the present invention. For example, the interior surface of the split cup sockets 505 and 507 can be cylindrically shaped, such that the long axis of that cylindrical shape intersects the center of the spherical body 500, and at the same time is perpendicular to the long axis of the first elongate aperture 513. The bottom surface of the bearing cup 502 can then be shaped as a cylinder of essentially the same radius, oriented in the same manner.

The interface between the bearing cup 502 and the split cup sockets 505 and 507 now define a cylindrical third bearing surface. The third bearing surface allows the cylindrical sliding motion of the cage-like structure 520 relative to base shaft 504 along first elongate aperture 513 required for proper joint function. Note that, although the free rotation of the cage-like structure 520 about the axis of base shaft 504 is not permitted by this design, this is compensated by the ability of the first shaft 501 to freely rotate about its own axis.

As illustrated, the split cup sockets 505 and 507 each further comprises a partial elongate aperture, 506 and 508 respectively. The function of these 'half slots' is to extend the angular extent of the second elongate aperture 514 to be defined by the spherical retainers 509 and 511. Although such extensions are not necessary for the function of this type of joint, they can greatly increase the accessible full cone angle of the final joint.

The split retainers 509 and 511 each comprise an internal spherical surface having spherical radius nearly that of the spherical body, and means to attach to the split cup sockets 505 and 507 so that the internal spherical surfaces of the split retainers and the top surface of the bearing cup 502 together make a spherical bearing surface with the surface of spherical body 500, which spherical bearing surface serves to confine spherical body 500 within cage-like structure 520 and restrict its relative motion thereto to rotation about the center of the spherical body. The edges of split retainers 509 and 511 also help define a second elongate aperture 514 in cage-like structure 520. As illustrated, the first and second elongate apertures are perpendicular, but a functional spherical joint can be made without this constraint.

When the joint is assembled as described above and as indicated in FIG. 5, the first shaft 501 can rotate relative to the cage-like structure 520 by sliding within the second elongate aperture 514. As FIG. 5 is drawn, this motion is in the xz plane. At the same time, the base shaft 504 is free to rotate relative to the cage-like structure 520 by sliding within first elongate aperture 513. The first shaft 501 is free to rotate around its long axis—a motion that simply spins the spherical body inside the nest of bearing surfaces comprising the bearing cup and the inside surfaces of the two sphere sockets. As drawn, the cup socket is free to rotate about a vertical axis as well, but this is not required for the proper operation of this type of joint.

Note that the tolerances required for these double-slotted joints are quite tight. In order to obtain proper function, the first, second, and third bearing surfaces must be simultaneously 'in contact' and concentric. Else, the smoothness of motion of the joint will suffer, as will the absolute positioning accuracy associated with the joint.

The above requirement can be restated. When the joint illustrated in FIG. 5 is properly assembled, two parameters must be essentially equal in magnitude. The first parameter is the sum of the diameter of the spherical body 500 and the thickness of the bearing cup 502. The second parameter is the size of the space within which those components must fit, that is, the distance between a) the point of intersection of the internal spherical surface defined by the split retainers and the long axis of the base shaft; and b) the point of intersection of the internal surface of the split cup sockets and the long axis of the base shaft. This distance must be substantially equal to the sum of the spherical body diameter and the bearing cup thickness for the resulting joint to move freely, yet without undue slop. In the absence of some ability to adjust the relative dimensions of the joint, this is a difficult criterion to meet.

Figure 6:
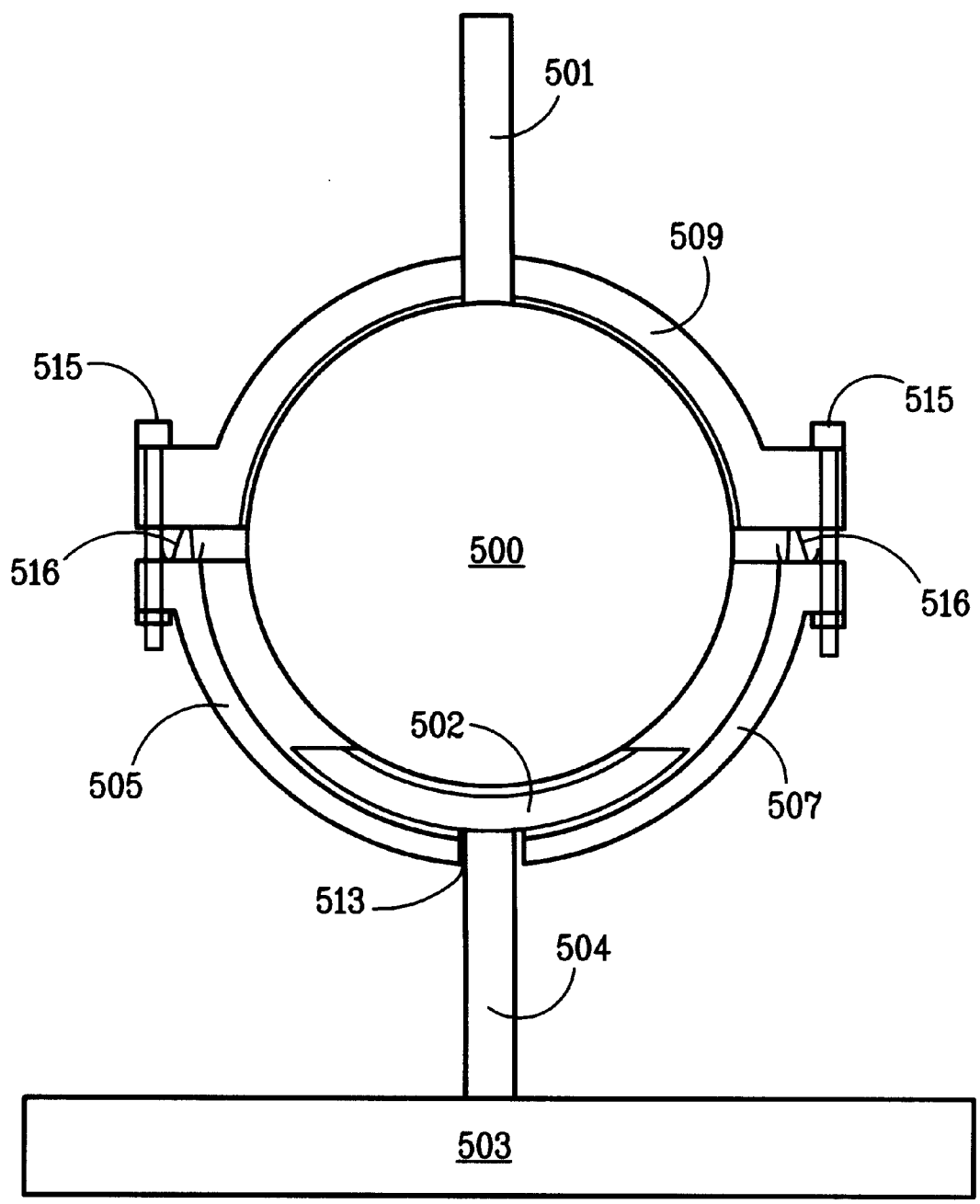
FIG. 6 shows schematically and in cutaway view a double slotted socket spherical joint after the present invention, including spring means for adjustment of the joint.

Assume, however, that there is some ability to change the separation between the split cup sockets and the split retainers. As shown in FIG. 6, if these are bolted together, a spring washer 516 or other compliant component might be placed between the surfaces, so that their separation depends on the torque applied to the bolts. When such a joint is assembled, and the adjustment made so that spherical body 500 is firmly but rotably held in place, then the third bearing surface is automatically adjusted for proper function. Another approach is to split the bearing cup into a top half and a bottom half, and interpose a spring between them. The result is automatic adjustment of the joint during assembly. Such adjustment capability can also compensate for degradation of joint function owing to wear. A vast variety of means to accomplish such adjustments are known in the art.

The group of double slotted socket spherical joints described above offers proper spherical joint behavior at very large full cone angles, while at the same time having no singularities of motion or dead spots. Clearly, the basic mode of operation of spherical joints according to the present invention can be obtained through many different structures than those chosen for the illustrative implementation above. The extent of the invention is intended to be set by the appended claims interpreted in light of the specification.

What is claimed is:

1. A double slotted spherical joint, comprising:
   a) a spherical body retained in said joint by a first and a second bearing surface;
   b) a first shaft affixed to said spherical body;
   c) a bearing cup comprising a top surface and a bottom surface, said top surface making the first bearing surface with said spherical body;
   d) a cup socket comprising a cup socket inner surface and a cup socket elongated aperture, said cup socket inner surface making a third bearing surface with said bottom surface of said bearing cup;
   e) a second shaft affixed to said bearing cup and passing through said cup socket elongated aperture; and,
   f) a spherical retainer comprising a retaining inner surface and a sphere retainer elongated aperture, said retaining inner surface making the second bearing surface with said spherical body, such that the first shaft passes through the spherical retainer elongated aperture.

2. The joint of claim 1, wherein the top surface of the bearing cup is concave and spherical.

3. The joint of claim 2, wherein the bottom surface of the bearing cup is convex and spherical.

4. The joint of claim 3, wherein the top surface of the bearing cup and the bottom surface of the bearing cup are concentric.

5. The joint of claim 1, such that the first shaft is radially affixed to the spherical body.

6. The joint of claim 1, such that the second shaft is radially aligned with the center of the spherical body.

7. The joint of claim 1, wherein the spherical retainer further comprises a first split retainer and a second split retainer, each of which has a retaining inner surface, such that the spherical retainer elongated aperture is defined by a space between the first split retainer and the second split retainer when they are functionally affixed to the joint.

8. The joint of claim 7, wherein the cup socket further comprises at least one partial elongated aperture which extends the spherical retainer elongated aperture.

9. The joint of claim 1, wherein the cup socket further comprises a first split cup socket and a second split cup socket, each of which has an inner surface making up the third bearing surface, such that the cup socket elongated aperture is defined by a space between the first split cup socket and the second split cup socket when they are functionally affixed to the joint.

10. The joint of claim 9, wherein the spherical retainer further comprises at least one partial elongated aperture which extends the cup socket elongated aperture.

11. The joint of claim 1, wherein
   a) the spherical retainer further comprises a first split retainer and a second split retainer, each of which has a retaining inner surface making up the second bearing surface, such that the spherical retainer elongated aperture is defined by a space between the first split retainer and the second split retainer when they are functionally affixed to the joint; and,
   b) the cup socket further comprises a first split cup socket and a second split cup socket, each of which has an inner surface making up the third bearing surface, such that the cup socket elongated aperture is defined by a space between the first split cup socket and the second split cup socket when they are functionally affixed to the joint.

12. The joint of claim 11, wherein each of the first split cup socket and the second cup socket further comprise a partial elongated aperture which extends the spherical retainer elongated aperture.

13. The joint of claim 11, wherein each of the first split retainer and the second split retainer further comprise a partial elongated aperture which extends the cup socket elongated aperture.

14. The joint of claim 1, further comprising adjustment means to properly space the first, second, and third bearing surfaces.

15. The joint of claim 14, wherein said adjustment means comprise springs interposed between the cup socket and the spherical retainer.

16. The joint of claim 14, wherein said adjustment means comprises replacing the bearing cup with the following assembly:
   a) an upper split bearing cup comprising a top surface, said top surface making the first bearing surface with the spherical body;
   b) a lower split bearing cup comprising a bottom surface, said bottom surface making the third bearing surface with the cup socket inner surface; and,
   c) a spring juxtaposed between the upper and the lower split bearing cups.

* * * * *